(12) United States Patent
Minelli

(10) Patent No.: US 9,439,354 B2
(45) Date of Patent: Sep. 13, 2016

(54) APPARATUS FOR HARVESTING OLIVES AND SIMILAR PRODUCTS

(75) Inventor: Ermanno Minelli, Correggio (IT)

(73) Assignee: MINELLI ELETTROMECCANICA, Correggio, (RE) (IT)

(*) Notice: Subject to any disclaimer, the term of this patent is extended or adjusted under 35 U.S.C. 154(b) by 419 days.

(21) Appl. No.: 14/110,973

(22) PCT Filed: Mar. 30, 2012

(86) PCT No.: PCT/EP2012/055892
§ 371 (c)(1),
(2), (4) Date: Oct. 10, 2013

(87) PCT Pub. No.: WO2012/143231
PCT Pub. Date: Oct. 26, 2012

(65) Prior Publication Data
US 2014/0033673 A1    Feb. 6, 2014

(30) Foreign Application Priority Data
Apr. 18, 2011  (IT) .............................. BO2011A0210

(51) Int. Cl.
A01D 46/26    (2006.01)
A01D 46/253   (2006.01)

(52) U.S. Cl.
CPC ........... *A01D 46/264* (2013.01); *A01D 46/253* (2013.01); *A01D 2046/266* (2013.01)

(58) Field of Classification Search
CPC .. A01D 46/24; A01D 46/253; A01D 46/264; A01D 2046/266
USPC ...... 56/12.4, 12.5, 35, 330, 332, 333, 340.1, 56/400.07, 328.1
See application file for complete search history.

(56) References Cited

U.S. PATENT DOCUMENTS

| | | | | |
|---|---|---|---|---|
| 3,813,860 A * | 6/1974 | Cecchi | ................. | A01D 46/253 56/328.1 |
| 4,222,219 A * | 9/1980 | Lasswell | ................ | A01D 46/24 56/328.1 |
| 5,437,146 A * | 8/1995 | Erickson | .............. | A01D 46/247 56/330 |
| 5,916,115 A * | 6/1999 | Pavone | .................. | A01D 46/24 56/328.1 |
| 6,425,233 B1 * | 7/2002 | Hosking | .............. | A01D 46/264 56/11.9 |

FOREIGN PATENT DOCUMENTS

EP  1795064 A1  6/2007
EP  2091317 A1  8/2009
(Continued)

*Primary Examiner* — John G Weiss
(74) *Attorney, Agent, or Firm* — McGlew and Tuttle, P.C.

(57) ABSTRACT

The apparatus for harvesting olives and similar products comprises a support body (2) suitable to be grasped; a shaker unit (3) comprising a containment box (7) suitable to be mounted at the top of the support body (2); at least one comb sector (6) shaping a support structure (9, 90, 99) provided with a plurality of teeth (10), carried mobile by the containment box (7); a motor member to actuate the comb sector (6) in a substantially swinging motion, a motor shaft (12) arranged substantially aligned to the longitudinal axis of the support body (2) and suitable to be actuated in a rotary motion by the motor member. The apparatus also comprises a first kinematic chain (14) actuated by the motor shaft (12), suitable to transmit a first rotary motion, and a second kinematic chain (15) also actuated by the motor shaft (12) and suitable to transmit a second motion of the substantially alternated type.

12 Claims, 14 Drawing Sheets

(56) References Cited

FOREIGN PATENT DOCUMENTS

| EP | 2 384 614 A1 | 11/2011 |
| EP | 2 091 317 B1 | 5/2012 |
| WO | 03/030625 A1 | 4/2003 |
| WO | 2008/071702 A1 | 6/2008 |
| WO | 2011/138058 A1 | 11/2011 |

* cited by examiner

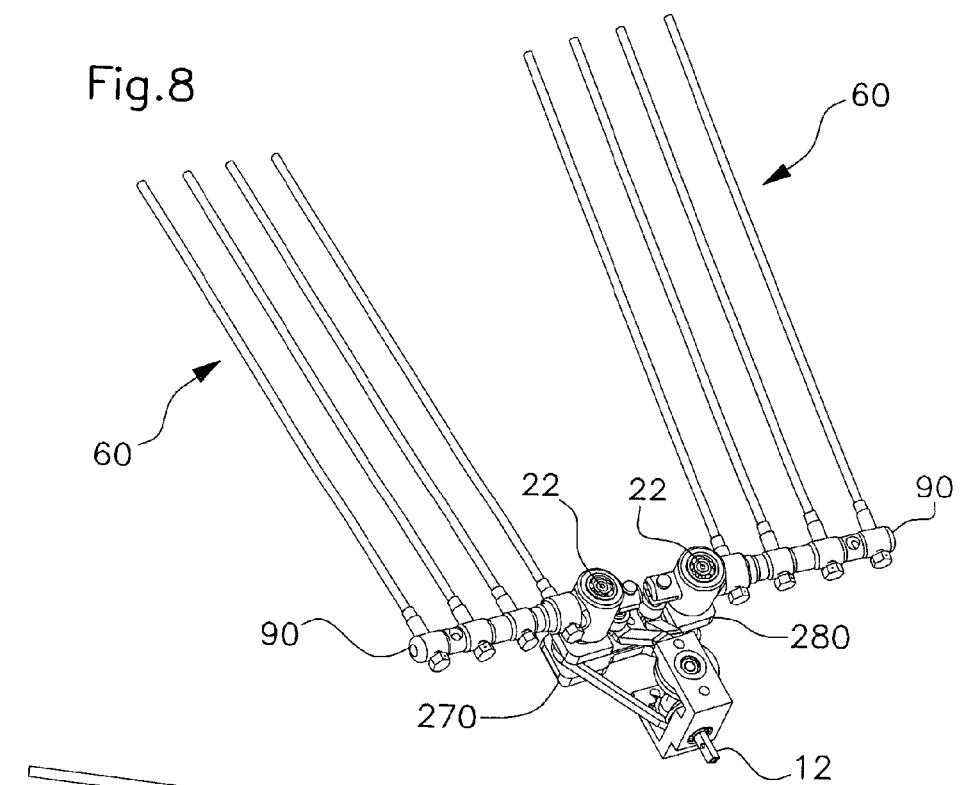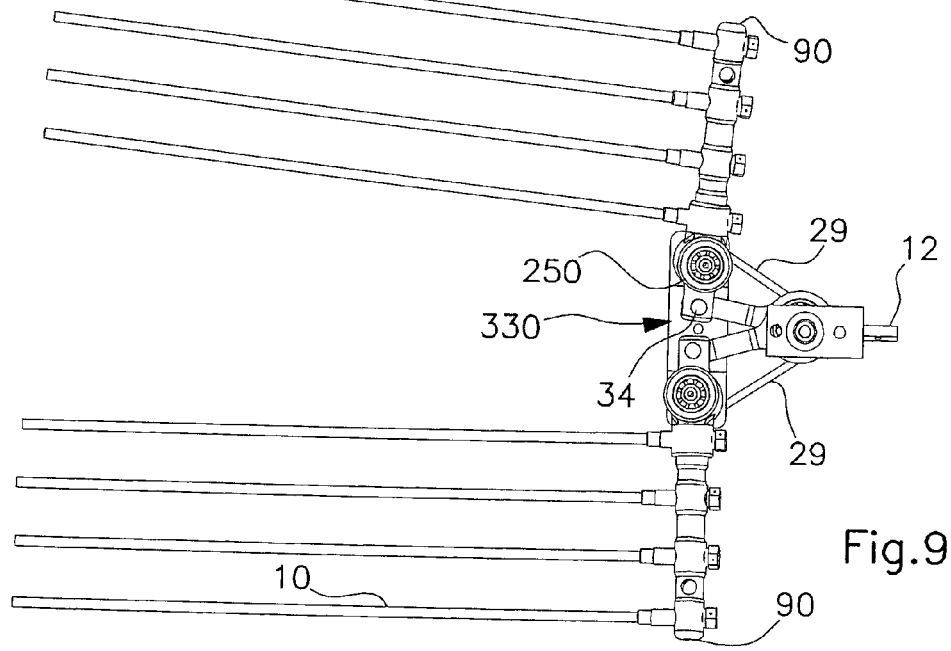

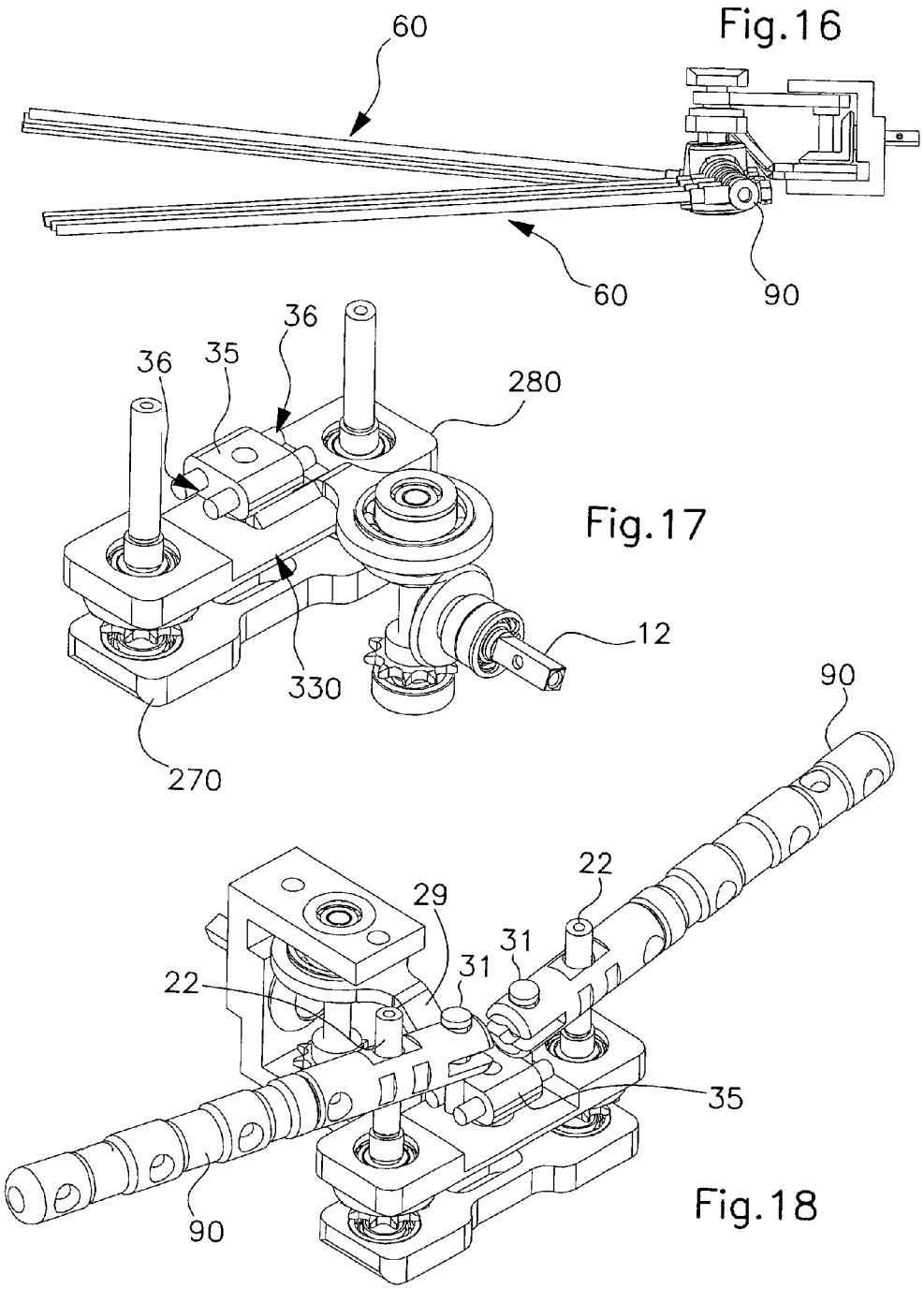

APPARATUS FOR HARVESTING OLIVES AND SIMILAR PRODUCTS

TECHNICAL FIELD

The present invention regards an apparatus for harvesting olives and similar products having small dimensions.

BACKGROUND ART

It has been known that in order to perform the harvesting of olives and of other similar products having small dimensions harvesting apparatuses are used, commonly called beaters, suitable to act on the branches of fruit trees, shaking them, in order to provoke the detachment and then the falling down of the fruits.

Such beaters generally provide a support rod, preferably of the telescopic type, suitable to be carried by an agricultural machine, or manually by an operator at a suitable end handle. At the free end the rod carries a series of shaker elements, suitably shaped for being inserted between the branches, and suitable to be actuated in rotation or in a swinging motion by means of drives of the pneumatic or electric type.

In particular, nowadays are known beater devices comprising comb shaped shaker elements, usually arranged in couple on the support at the end of the support rod. Such elements are suitable to be driven oscillating between a closed configuration, having the combs arranged facing on parallel planes, and an opened configuration, with diverging combs.

For example patent application EP1795064 A1 discloses an apparatus for harvesting olives comprising a couple of combs designed to engage with the fruits to be harvested, a support rod for the combs which extends from one end of a central structure, a grip portion made on the aforesaid central structure, a motor member suitable to move the combs and means for transmitting motion form the motor member to the combs.

Patent application no. EP2091317 A1 illustrates a shaker device comprising a body arranged at the top of a support rod and carrying a shaker member suitable to be actuated through the interposition of transmission means by actuation means according to a conical pendular motion. The transmission means comprises a lever carried radially by the driving shaft and a support pin connected at one end to the aforesaid lever and at the opposite end to the shaker member. Spherical connection means are provided between the cited connection pin and the box for containing the body of the beater device.

The known beaters have made the olive harvesting operations quicker and easier, nevertheless they still present considerable drawbacks.

First of all such devices have rather complex structures, difficult to assemble and laborious to disassemble in case of maintenance.

Moreover the known devices present considerable bulk volume and weight, sometimes not perfectly equilibrated. For this reason the insertion of the shaker members among the branches of the trees can turn out problematic and hard for the operator. Furthermore such devices of known type can produce an inhomogeneous "combing" motion inside the foliage of the tree, increasing the risk of damaging the plants. In fact if the shaker elements do not act in a homogeneous way on the foliage of the tree, the harvesting effect can result excessively concentrated in some parts, until scratching the branches, while viceversa it can result ineffective in other zones, with insufficient results for the harvest. In particular scratching the branches can turn out to be a very harmful action when it involves the germinable part of the plant, since it can compromise the production of fruits for the following year. Such a risk is increased by the arising of undesired vibrations which can occur following the actuation of the beating elements, when these latter are not perfectly equilibrated.

DISCLOSURE

The task of the present invention is that of solving the aforementioned problems, devising an apparatus which allows to perform in an effective and safe way the harvesting of olives and similar products.

Within such task, it is a scope of the present invention that of providing an apparatus for harvesting olives which presents a compact structure and is easy to use for the operator.

Another scope of the present invention is that of providing an apparatus for harvesting olives which is easy to assemble and to maintain.

A further object of the present invention is that of providing an apparatus for harvesting olives having a simple conception and a reliable structure.

The cited scopes are attained, according to the present invention, by the apparatus for harvesting olives and the like according to claim 1.

More precisely the apparatus according to the invention solves the cited problems thanks to the provision of a first kinematic chain and of a second kinematic chain both suitable to receive in input a same rotary motion driven by a motor shaft, but in the meantime suitable to produce in output two different motions: a first motion of the rotary type and a second motion of the substantially swinging type. The cited kinematic chains are also connected separately, that is in parallel, to the shaker means of the apparatus, represented by at least one comb sector comprising a support structure constrained integral to a plurality of teeth suitable to perform the combing of the foliage of a plant to be treated. In substance each kinematic chain is constrained in output to a respective portion of the support structure for the teeth, leading to a double and differentiated actuation of the same. The shaker means therefore results mobile according to a swinging motion in the space.

Advantageously the apparatus further comprises transmission means connected in input to the motor shaft to receive the rotary motion thereof and in output, in parallel, to both the cited first kinematic chain and the cited second kinematic chain. Such a provision allows to obtain an apparatus having a very compact structure, which is therefore easy to manipulate and with a noninvasive effect, but delicate on the plant to be treated.

Preferably the first kinematic chain is suitable to produce in output a first motion of the rotary type on a revolution pin having a portion for keying to the same chain and a portion inclined with respect to this latter, inserted rotatable in the support structure of the teeth. As a consequence the above said inclined portion is suitable to be actuated according to a revolution motion.

Preferably the second kinematic chain is instead suitable to produce in output a substantially alternated motion of a guide pin constrained as well to the cited support structure of the teeth.

Therefore the support structure receives both the cited motions at suitably spaced portions. The combination of such a first motion and of such a second motion produces in the shaker means a resultant motion of swinging in the space.

In other words the cited crossbar supporting the teeth is pivoted to an axis mobile according to the aforesaid revolution motion of the inclined portion of the revolution pin. At the same time the crossbar is taken to swing about the above said axis mobile in the space by effect of the actuation in alternated motion exerted by the guide pin also fixed to the crossbar. The guide pin is more precisely cons trained to a portion of the crossbar distal with respect to the portion for hinging to the revolution pin, in a way as to produce a swinging motion. It results therefrom a combined motion swinging in the space for the shaker means, which makes easier a combing which is effective and well distributed inside the foliage of the tree to be treated.

In particular it is to be observed that the spatial resultant motion in output to the shaker means of the apparatus enables an interaction having a variable orientation on the plant, such as to reach branches of any extension and arrangement inside the foliage.

The extension of the volume swept by the shaker means can also be determined on the basis of the plant to be treated and of the type of fruit, by suitably varying the extension, the number and/or the orientation of the teeth on the support structure. Moreover it is possible to vary in a very flexible way the features of the resulting swinging motion modifying the kinematic parameters of the first and of the second kinematic chain provided, for example the conformation of the swinging pin and of the guide pin, further to the positioning of these latter on the support structure.

The provision of a couple of comb sectors or semi-sectors, arranged side by side at the top of the support rod of the apparatus, is particularly advantageous. In such a case the actuation in opposite sense of the respective resulting swinging motions is particularly advantageous. In fact such an actuation allows to obtain a balance of the dynamic actions on the apparatus and in the meantime to perform a distributed, gradual and effective interaction on the foliage of the tree.

At last a further advantageous aspect of the invention is to be highlighted in the provision of a support structure for the combs comprising a main crossbar and an auxiliary crossbar arranged incident according to a determined angular relationship of the respective longitudinal axis, for example a perpendicularity relationship. In any case, the auxiliary crossbar is usefully connected to the first kinematic chain and to the second kinematic chain, while the main crossbar carries integrally the teeth suitable to comb the plant. Therefore in such a solution the afores aid spatial motion is transmitted to the auxiliary crossbar through the above said kinematic connections and as a consequence rigidly transmitted to the main crossbar carrying integrally the teeth. So the resulting motion of the teeth is produced by the tipping over in the space of the motion transmitted to the auxiliary crossbar, the above said tipping over being consequent to the particular angular relationship existing between the main crossbar and the secondary crossbar.

Particularly advantageous is the solution wherein is provided a couple of comb sectors and for each comb sector an arrangement substantially perpendicular between the longitudinal axis of the main crossbar and of the auxiliary crossbar respectively. In such a case the comb sectors are reciprocally facing, mobile according to motions of opening and closing swinging in the space. Furthermore in such a case it is possible to adjust in a very flexible way the volume comprised between the combs, simply positioning suitably the rigid fixing link between the main crossbar and the auxiliary crossbar.

DESCRIPTION OF DRAWINGS

Details of the invention shall be more apparent from the detailed description of a preferred embodiment of the apparatus for harvesting olives and similar products and of further embodiments, illustrated for indicative purposes in the attached drawings, wherein:

FIGS. 8, 9, 10 and 11 respectively show a perspective view, a front view, a plant view and a lateral view of a portion of the apparatus according to the invention, without protection carter, according to a second embodiment;

FIGS. 13, 14, 15 and 16 respectively show a perspective view, a front view, a plant view and a lateral view of a portion of the apparatus according to the invention, without protection carter, according to a third embodiment;

FIGS. 17 and 18 show respective perspective views of different units used in the same apparatus illustrated in FIGS. from 13 to 16, in different assembling steps;

BEST MODE

Figure 1:
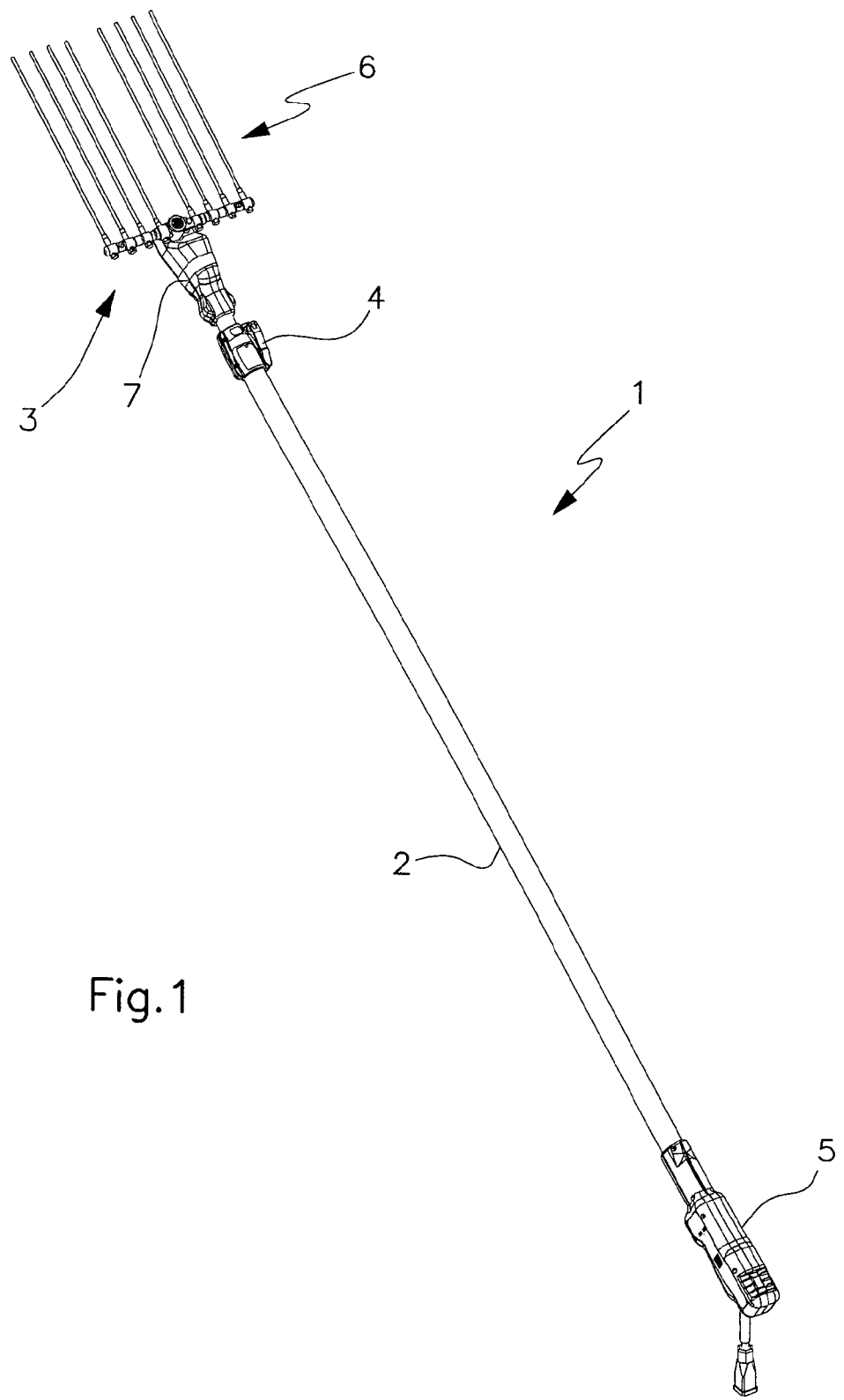
FIG. 1 shows a perspective view of an apparatus for harvesting olives according to the invention.

With particular reference to such figures, the apparatus for harvesting olives and similar products according to the invention is indicated in its entirety with 1. The apparatus comprises a support body 2 at the top of which is applied a shaker unit 3.

In a preferable but not limitative manner the support body comprises a tubular shaped support rod, preferably of the telescopic type. As in the illustrated case, the rod 2 is in such a case provided with a suitable lever 4, distal with respect to a handle 5, for adjusting the length (see FIG. 1). Alternatively the support body can be directly connected to the shaker unit 3 without the interposition of any means of the rod type.

Inside a casing for example made of plastics, suitable to define the handle 5 of the rod 2, electric connection means is housed in order to enable the feed of the power supply used for actuating the shaker unit 3, for example from a generator of the battery type. The handle 5 is provided with control means of known type, suitable to control the dispense or the interruption of the supply provided by the aforesaid supply means or by different supply means. Alternatively the apparatus according to the invention can be actuated through a motor member of the shoulder electric type or for cars or, again, of the piston type or pneumatic.

The shaker unit 3 is provided with at least one comb sector 6, with a containment box 7 or protection carter, inside which is housed a drive unit 8 for driving the same comb sector 6. In the first embodiment illustrated in FIGS. from 2 to 7 is provided a unique comb sector 6 suitable to be driven by the drive unit 8. In the following further embodiments which provide a plurality of comb sectors are also described.

Figure 5:
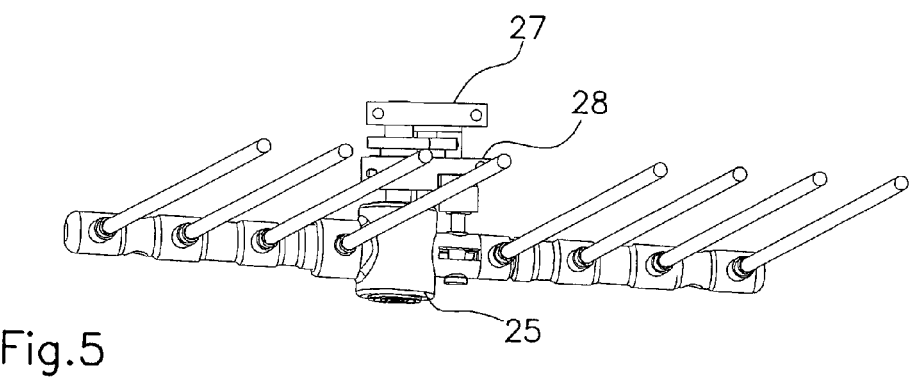

The comb sector 6 presents a support structure 9 on which is prearranged in series a plurality of teeth 10, suitably spaced. In the illustrated case, the support structure 9 is realized by means of a crossbar on which are fixed integrally the teeth 10, but further possible embodiments are described in the following. Such teeth 10 have a tubular shape and extend, starting from the crossbar 9, in a substantially rectilinear way. In such a case the teeth 10 of the comb sector 6 have the same longitudinal extension, in particular with a distribution uniform along the crossbar 9 and a reciprocally parallel orientation, to make easier, in use, the distributed insertion into the foliage of the tree. Different embodiments of the teeth 10 can be provided, for example having an undulated, curved or conical development. Moreover the teeth 10 can be arranged on a same median longitudinal plane on the respective crossbar 9, as can be seen in particular in FIG. 5, or on alternatively staggered longitudinal planes, reciprocally diverging from the crossbar 9. Still, the crossbar 9 can have a tubular shape, for example with a circular section, or with a polygonal triangular or quadrangular section, with the teeth 10 fixed by means of known engagement and fixing means 11 at a median axis or in proximity of the peripheral surface, or made integral to the support structure 9, for example through moulding. In particular, in the case in which the teeth are made as a separated component, the crossbar 9 can present increased strengthening sections 9a at the openings for inserting the fixing means 11 of the teeth 10 in order to avoid that the support structure is weakened.

The crossbar 9, that is the support structure integral to the teeth 10, is constrained through respective distanced portions to corresponding drive means, so as to lead to a correspondingly combined motion of the teeth 10, as better illustrated in the following.

The containment box 7 is preferably made in two substantially symmetric covers, suitable to be reciprocally fixed such as to contain the drive unit 8 of the shaker unit 3 (see FIG. 1).

The drive unit 8 of the shaker unit 3 comprises a motor member suitably housed inside the handle 5 or at the top of the same support rod 2. The drive unit 8 also comprises a motor shaft 12, transmission means 13 for transmitting the motion driven by the motor shaft 12, as well as a first kinematic chain 14 and a second kinematic chain 15 for transmitting respectively a first output motion and a second output motion, suitable to be combined in a resultant motion of swinging in the space for the comb sector 6, as better described in the following.

The drive and transmission means of the drive unit 8 are suitable to be supported by a box support structure 16 comprising for example a couple of opposite lateral support walls which extend from a support base.

Figure 2:
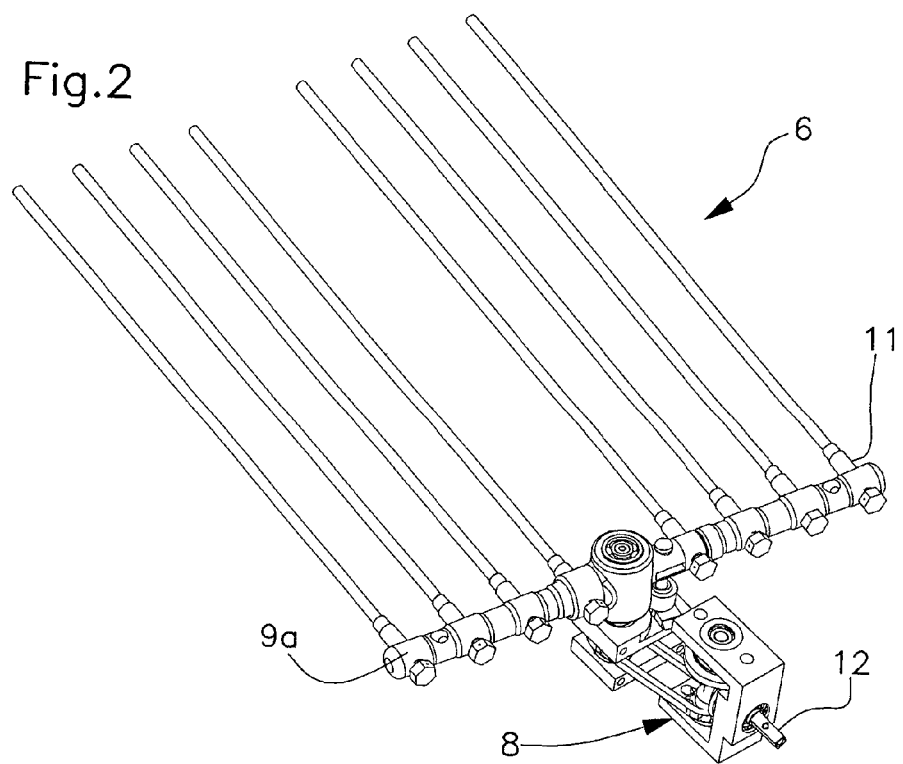
FIGS. 2 and 3 show a perspective view, respectively from a front and from a rear point of view, of a portion of the same apparatus, without protection carter, according to a first embodiment.
Figure 3:
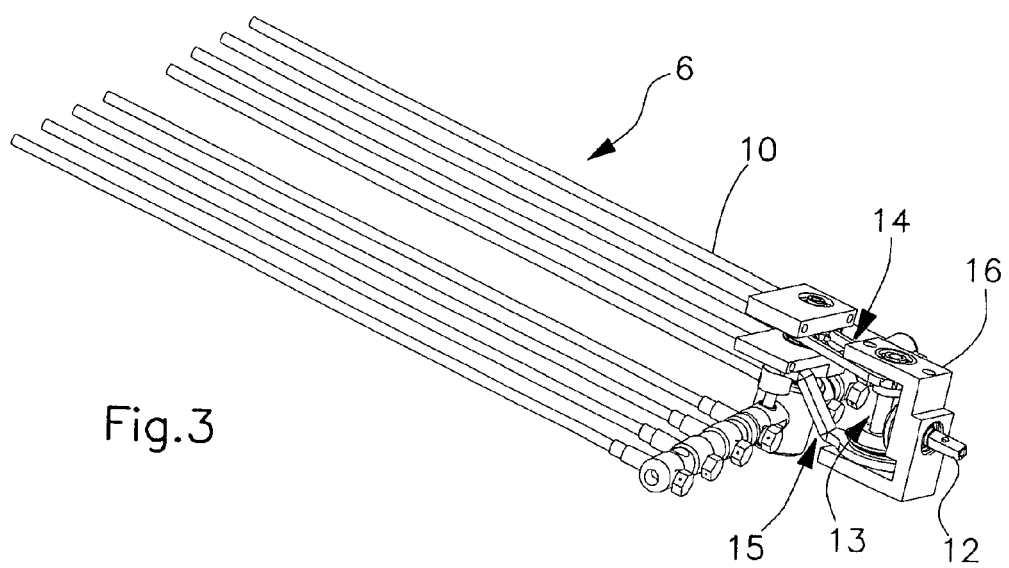
Figure 4:
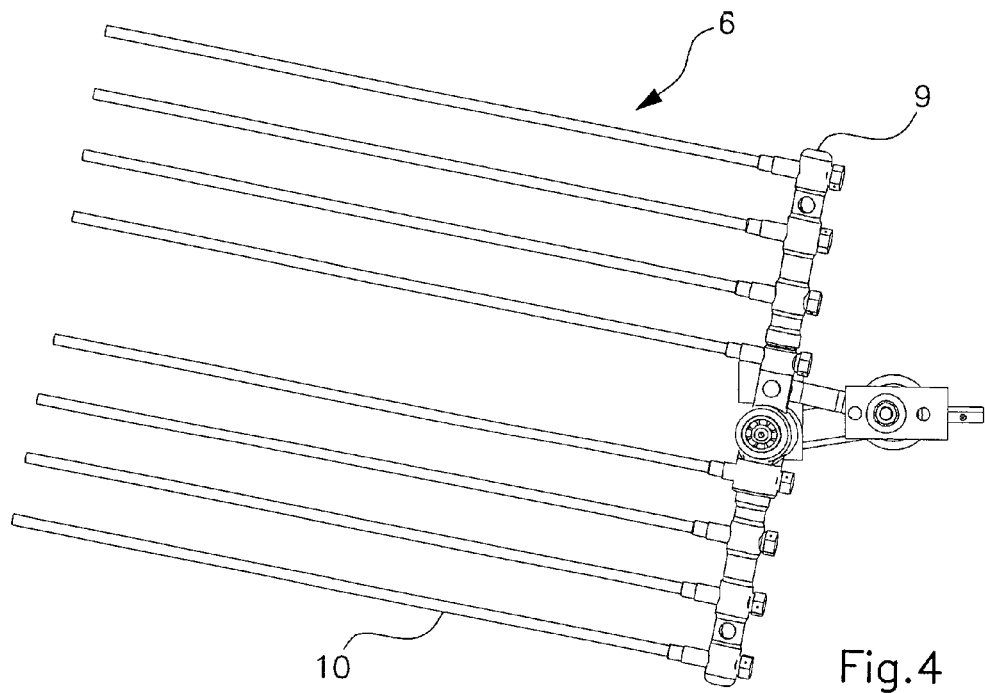
FIGS. 4, 5 and 6 respectively show a front view, a plant view and a lateral view of the same portion of the apparatus illustrated in FIGS. 2 and 3.

The motor shaft 12 is preferably arranged coaxial to the support rod 2 (FIGS. 2 and 3) and is suitable to be driven in rotation by the cited motor member.

The transmission means 13 can be made of a gearwheel preferably of the conical gears type, comprising a driving wheel 17 keyed to the motor shaft 12 and a driven wheel 18 keyed to a transverse pin 19 driven for example perpendicularly to the motor shaft 12. The transverse pin 19 is fixed preferably on the opposite walls of the box support structure 16 by the interposition of rolling support means of the known type. The transmission means 13 is suitable to transfer the rotational motion driven to the first kinematic chain 14 and to the second kinematic chain 15 through the transverse pin 19. The first kinematic chain 14 is preferably realized through an auxiliary gearwheel 20 comprising a couple of auxiliary wheels 21 respectively keyed directly on the transverse pin 19 and on a revolution pin 22 suitable to move the shaker unit 3. The auxiliary wheels 21 are preferably connected through flexible transmission means 23 of the type of the belt or of the chain or of equivalent means for transmitting a rotary motion between parallel axes, such as the corresponding keying portions of the transverse pin 19 and of the revolution pin 22.

Figure 6:
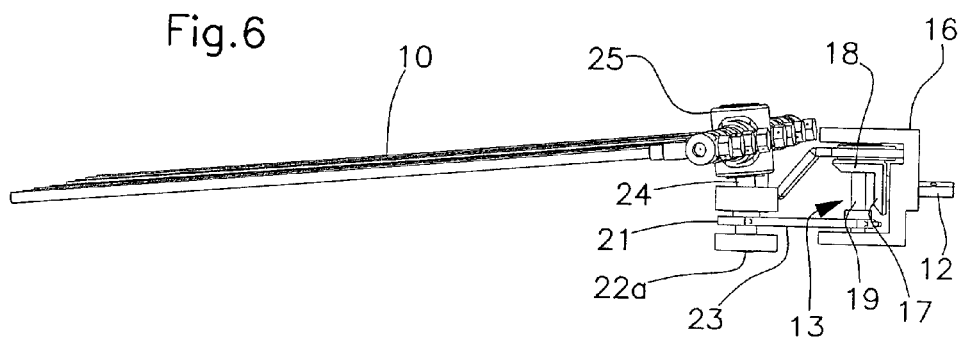
Figure 7:
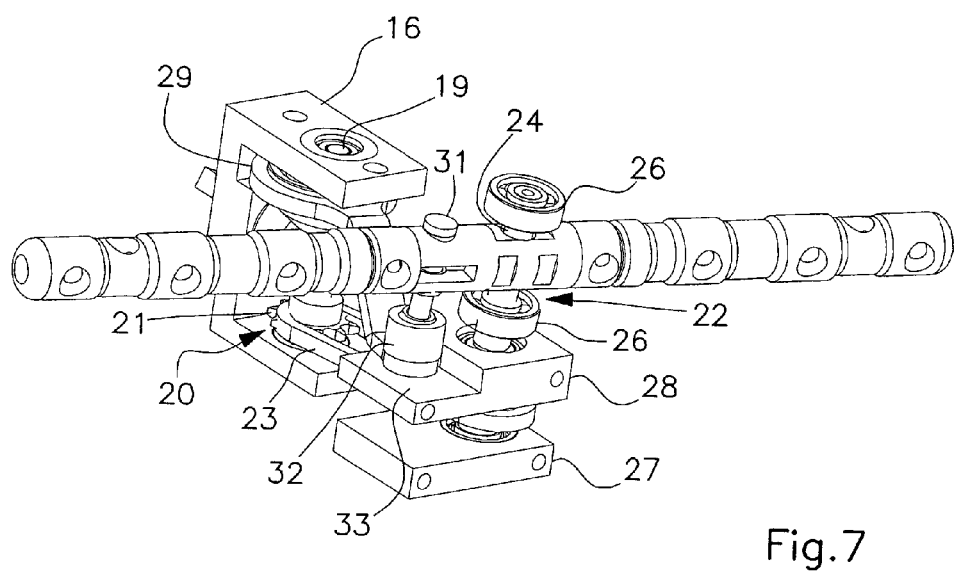
FIG. 7 shows a perspective view of a unit used in the same apparatus, illustrated in FIGS. from 2 to 6.
Figure 10:
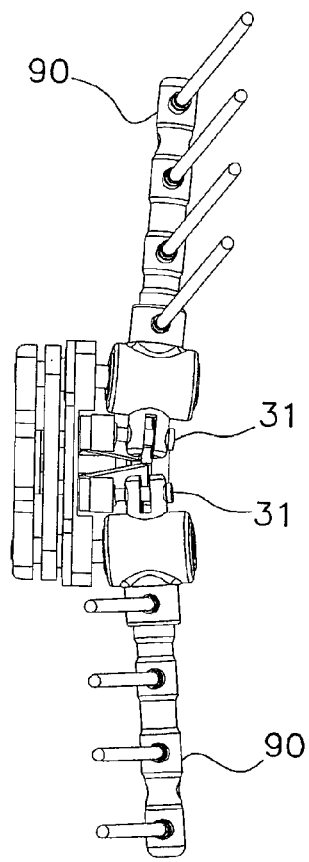
Figure 11:
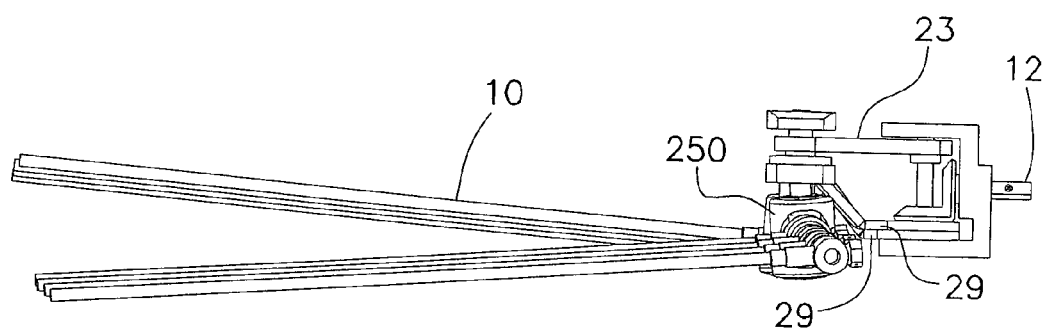
Figure 12:
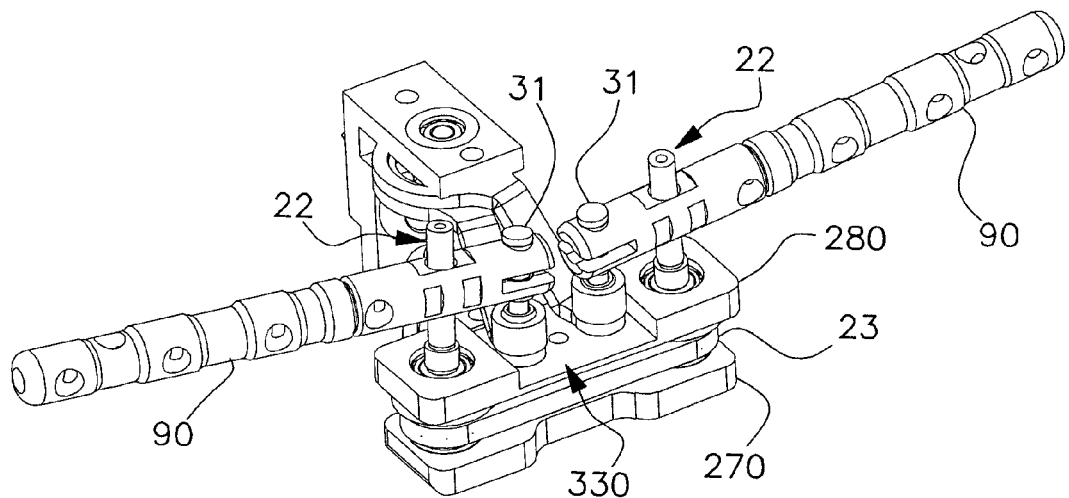
FIG. 12 shows a perspective view of a unit used in the apparatus according to the embodiment illustrated in FIGS. from 8 to 11.
Figure 13:
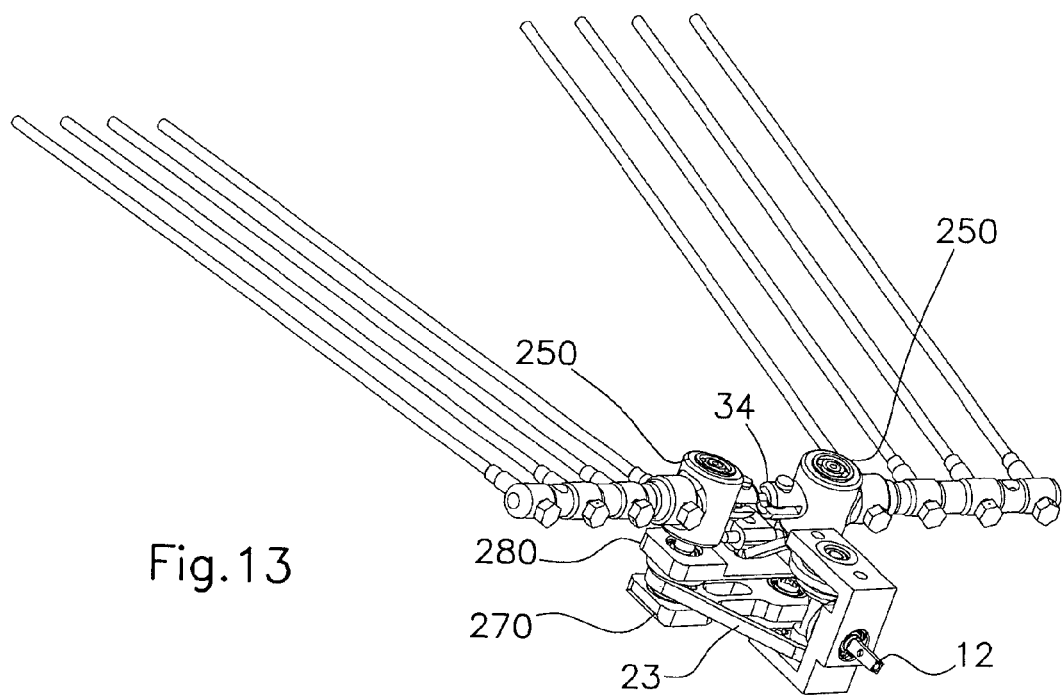
Figure 14:
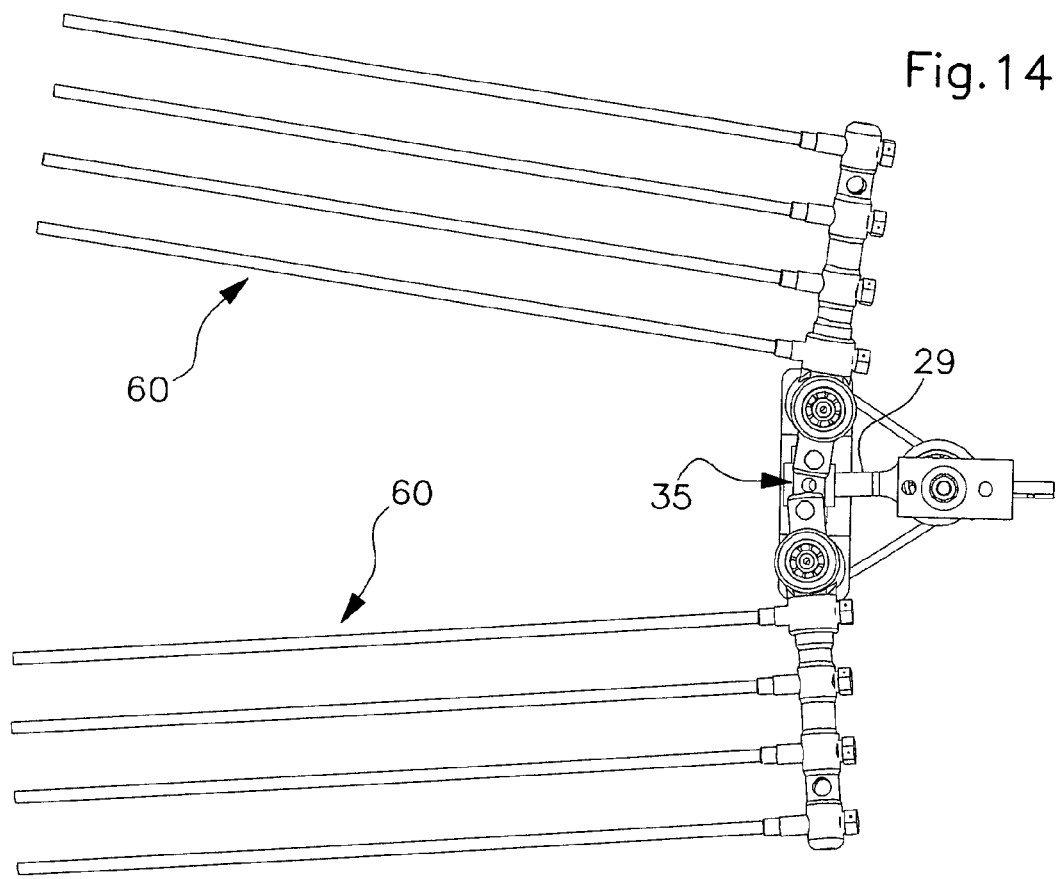
Figure 15:
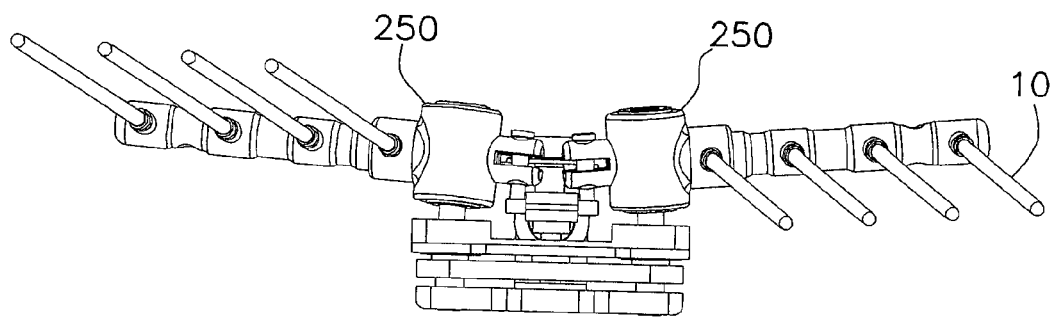
Figure 19:
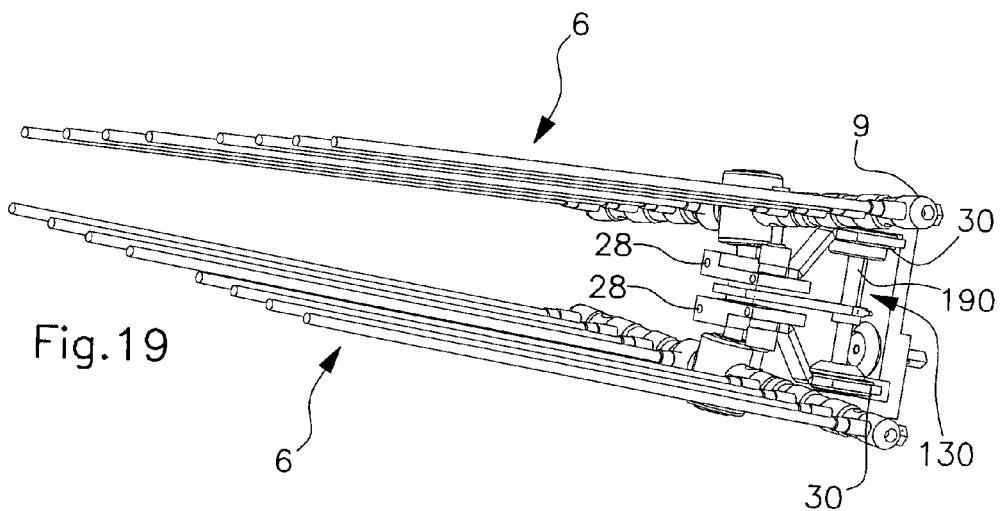
FIGS. 19, 20, 21 and 22 respectively show a perspective view, a front view, a plant view and a lateral view of the apparatus according to the invention, in a fourth embodiment.
Figure 20:
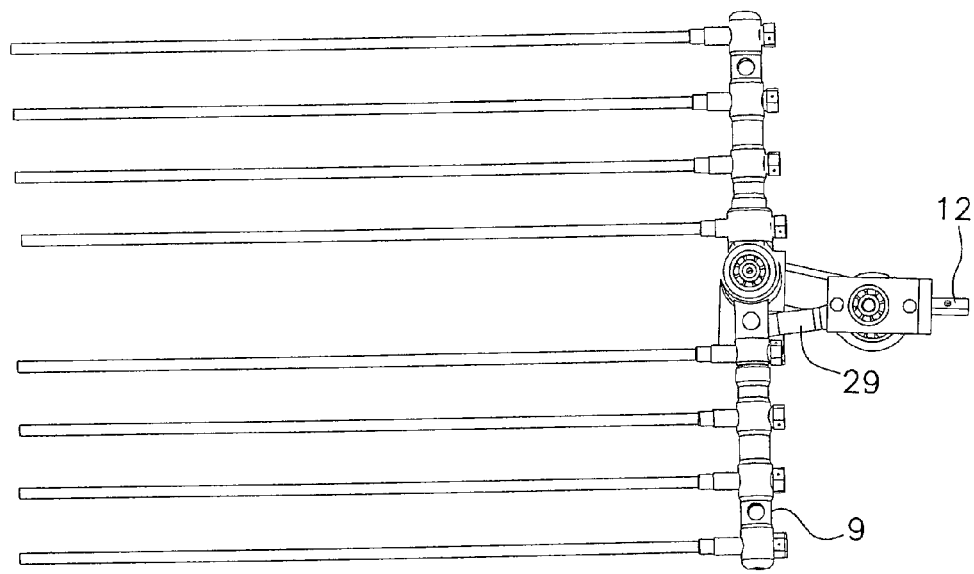
Figure 21:
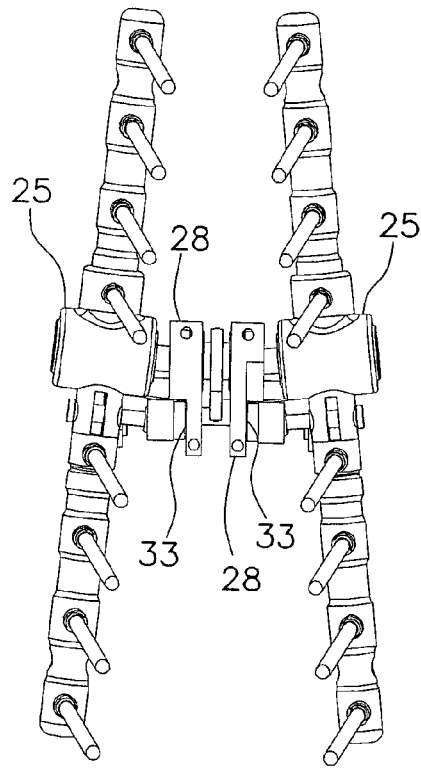
Figure 22:
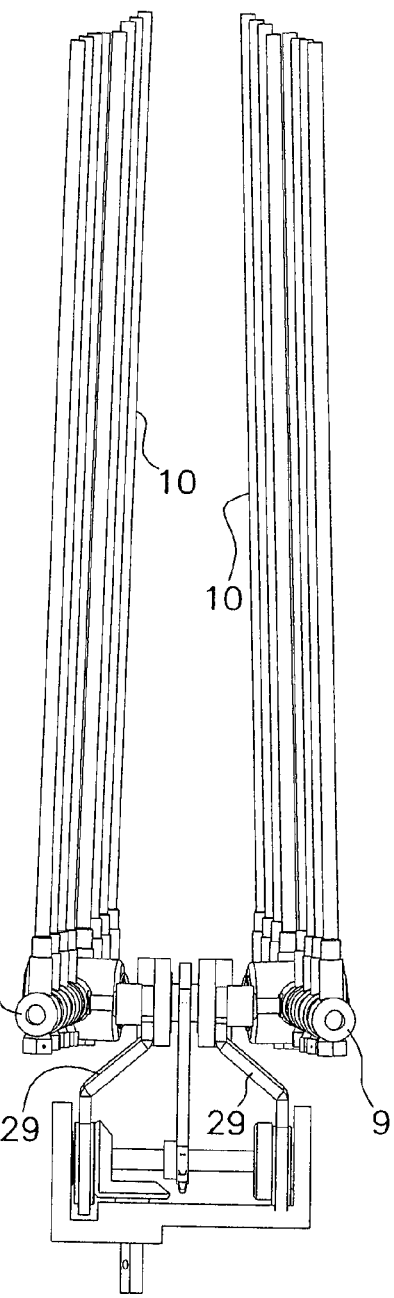

The revolution pin 22 comprises in particular a keying portion 22a arranged with axis parallel to the transverse pin 19 and an oblique portion 24, that is deviated with respect to the condition of parallelism with the transverse pin 19 (see in particular FIGS. 6 and 7). Therefore owing to the driving in rotation of the motor shaft 12, the oblique portion 24 of the revolution pin 22 is suitable to perform a revolution motion which describes a cone having an axis coinciding with the rotation axis of the auxiliary wheel 21 keyed to the revolution pin 22 and having as generators the whole of the configurations instantaneously assumed by the axis of the oblique portion 24.

The revolution pin 22 is suitable to be inserted rotatable in a corresponding connection hole of the crossbar 9. In the case illustrated in FIGS. from 2 to 7 the revolution pin 22 is inserted in the crossbar 9 at a substantially central portion, but different arrangements are similarly possible, for example proximal to one end, as described and illustrated in the following. The revolution pin 22 is provided with a substantially cylindrical protection casing 25, for example made of two separated covers, inserted covering the oblique portion 24 through the interposition of suitable rolling support means 26. The protection casing 25 can comprise a tubular protrusion suitable to cover a corresponding lateral portion of the crossbar 9 or a couple of opposite lateral protrusions. Advantageously one or more teeth 10 can be fixed also on the aforesaid tubular protrusion, as illustrated in the figures, to obtain a distribution of the same teeth 10 as uniform or concentrated as possible.

At last the revolution pin 22 is preferably supported through support means autonomous from the box support structure 16, for example to allow to vary the centre distance between the auxiliary wheels 21 simply adjusting the flexible transmission means 23. Such support means can comprise for example a first plate 27 suitable to be fixedly constrained to the containment box 7 and a second support plate 28 suitable to be constrained to an opposed wall of the containment box 7 in a substantially parallel way. More precisely the revolution pin 22 is suitable to be inserted in suitable insertion openings obtained in the aforesaid plates 27, 28 and to be supported by these latter through the interposition of rolling support means of known type.

The second kinematic chain 15 is suitable to transform autonomously with respect to the first kinematic chain 14 the motion transmitted to the transverse pin 19 of the transmission means 13. The second kinematic chain 15 comprises a connecting rod member 29 constrained rotatable to a disk 30 eccentrically keyed to the driven wheel 18 of the transmission means 13, suitable to drive the first kinematic chain 14 in the meantime and separately.

At the end opposite to the disk 30 the connecting rod member 29 is also articulated to a guide element 31, for example a pin, through suitable articulation means 32. In the case illustrated in FIGS. from 2 to 7 the articulation means 32 are made through an articulated joint. The guide pin 31 is also blocked transversely to the crossbar 9. More precisely the crossbar 9 is con strained rotatable to the revolution pin 22 and to the guide pin 31 at respective distal portions. For example in the illustrated case the revolution pin 2 and the guide pin 31 are inserted transversally to the crossbar 9 at portions reciprocally distal to a substantially central zone of the crossbar 9. Alternatively the guide pin 31 can be inserted in different portions of the crossbar 9 for example in an end portion, as better exemplified in the following.

The second plate 28 can present an operating sliding surface 33 for the connecting rod member 29. Such an operating surface 33 is suitable to compensate possible dynamic actions in normal direction, discharging usefully the mechanical parts involved in the transmission of the motion, therefore firstly the connecting rod member. It is to be observed that the connecting rod member 29 is suitably shaped also depending on the longitudinal extension of the guide pin 31 and therefore of the radial distance between the articulated joint 32 and the crossbar 9. For such a reason in fact the connecting rod member 29 preferably presents an inclined intermediate portion, as a connection between the plane wherein lies the articulation to the eccentric disk and the plane of articulation to the articulated joint 32. Furthermore by varying the extension of the guide pin 31 it is possible to modify the resultant motion of the comb sector 6.

The motion of the support structure 9 carrying integral the teeth 10 is determined by the composition of two motions, both generated by the same main rotational motion of the motor shaft 12. In fact at one side the motor shaft 12 provokes through the first kinematic chain 14 a revolution motion of the support structure 9 about the axis of the respective auxiliary wheel 21 keyed to the revolution pin 22, at the other side an alternated swinging motion about a mobile axis, represented by the axis of the inclined portion 24 of the same revolution pin 22, thanks to the second kinematic chain 15. In particular such a swinging motion about a mobile axis is guided by the motion driven on the articulation means 32 by the connecting rod member 29.

In a second embodiment illustrated in FIGS. from 8 to 12, functionally totally similar to the one previously described, the apparatus 1 presents a couple of comb sectors 60 or semi-sectors arranged side by side. In this case each comb sector 60 is applied to a respective crossbar 90 driven similarly to the previous case. In practice each crossbar 90 is driven by a respective revolution pin 22 and guided at the proximal end by means of a respective guide pin 31 articulated in its turn to guide means represented by an articulated joint 32 as in the previous case. In particular each articulated joint 32 is articulated to the end of the respective connecting rod member 29 driven in motion by the transverse pin under effect of the rotatable coupling to the eccentric disk already cited. The guide pins 31 are positioned side by side in a substantially median position of the apparatus, while the crossbars 90 extend laterally in a substantially symmetric manner, for example with the teeth 10 arranged radially. In the same way as the connecting rod members 29 the auxiliary wheels 21 as well are suitably doubled owing to the provision of a couple of swinging pins 22, instead of one only pin as in the previously illustrated case. Correspondingly the auxiliary wheels 21 for driving the swinging pins 22 are supported by a first plate 270 and by a second plate 280 respectively constrained in a fixed way to the containment box 7. Advantageously the second support plate 280, similarly to the previously described case, presents a substantially central sliding surface 330 whereon both connecting rods 29 provided can match suitable support. Such a solution is particularly advantageous as the weight of the components in motion results balanced and, as a consequence, the arising of vibrations is minimum. It is further to be noted that in such a case each connecting rod member 29 has a relatively reduced weight, in the same way as the auxiliary wheels 21, as it is suitable to drive a semi-sector 60 instead of a unique sector having a substantially double transverse extension, as in the previous case.

At last in such a case it is observed that since the guide pin 31 is blocked at the end of the crossbar 90, it can be constrained to this latter at a respective lateral protrusion 34, for example a fork protrusion, of the protection casing 250. Usefully the lateral protrusion 34 presents a suitable connection hole. The remaining technical features are totally similar or can be applied to the embodiments described in the preceding or in the following.

In a third embodiment illustrated in FIGS. from 13 to 18, functionally similar to the previously described embodiment, the apparatus 1 equally comprises a couple of semi-sectors 60. Nevertheless unlike the second described embodiment, the second kinematic chain 15 comprises a unique connecting rod member 29 articulated to a guide joint 35 shaping suitable guide seats 36 for the guide pins 31. The guide joint 35 can be made through a suitable body or small block articulated to the end of the connecting rod member 29 on the operating surface 330. The guide seats 36 can be made on opposite lateral surfaces of the small block 35 through respective couples of pins 37. The pins 37 are arranged parallel side by side at a reciprocal distance such as to define a suitable space for housing sliding a corresponding operating end of the guide pins 31. Therefore each guide pin 31 finds a suitable articulation seat in the respective couple of pins 37 laterally protruding from the small block 35 mobile above the operating surface 330 through the driving of the connecting rod member 29. The remaining technical features are totally similar or can be applied to the embodiments described in the preceding or in the following.

Figure 23:
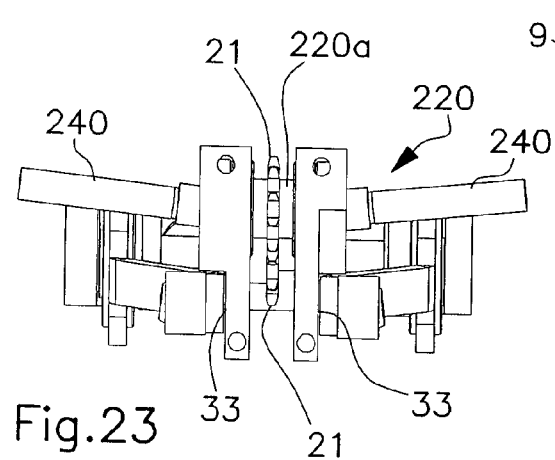
FIG. 23 shows a view of a particular unit used in the apparatus illustrated in FIGS. from 19 to 22.
Figure 24:
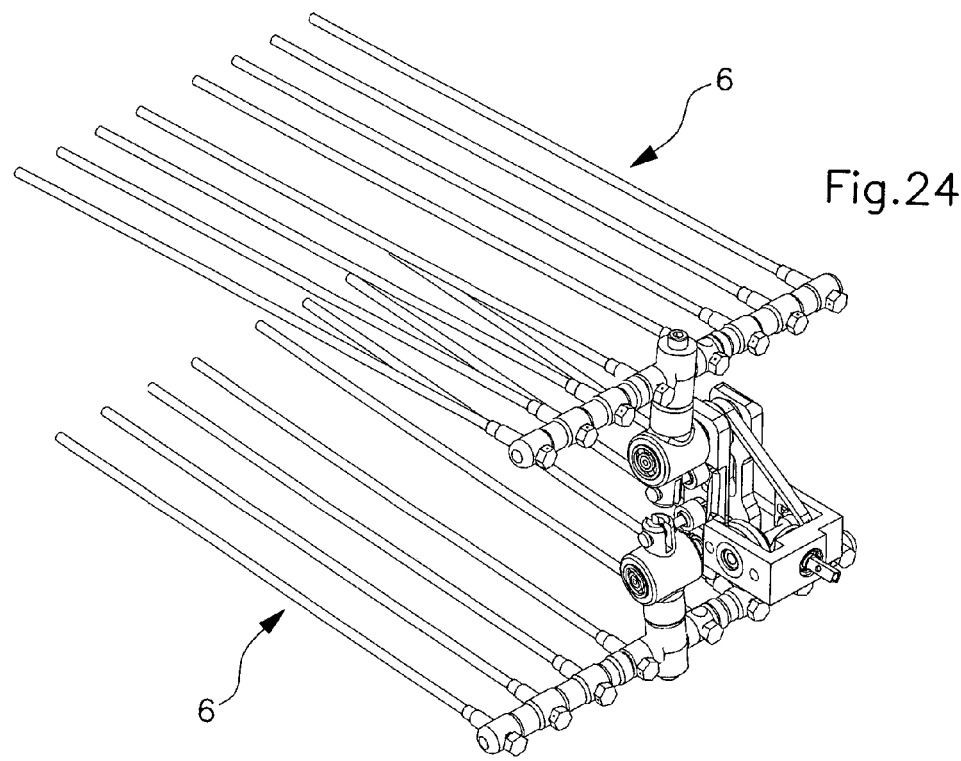
FIGS. 24, 25, 26 and 27 respectively show a perspective view, a front view, a plant view and a lateral view of a fifth embodiment of the apparatus according to the invention.
Figure 25:
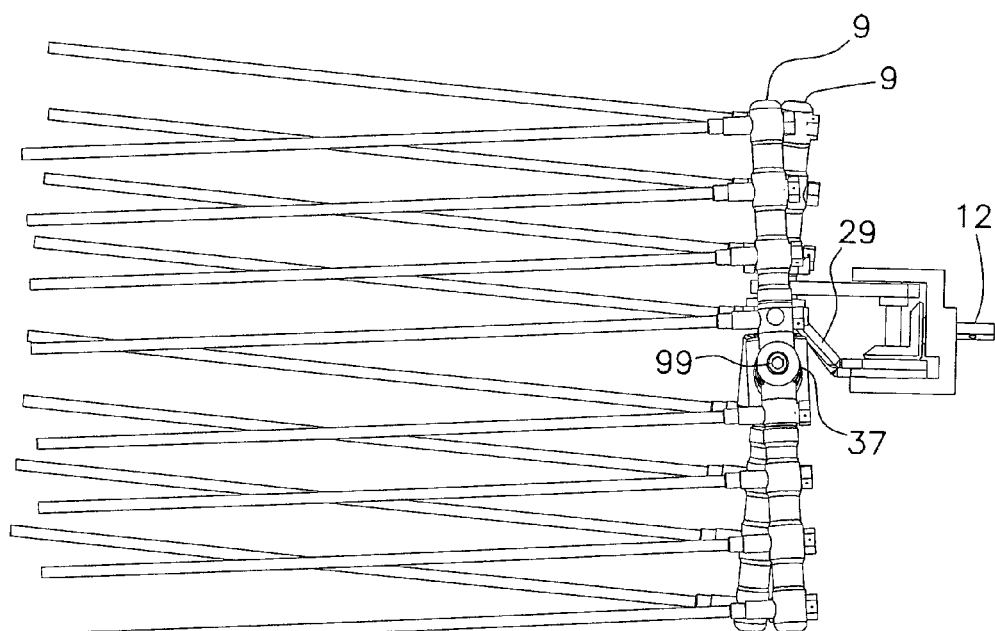
Figure 26:
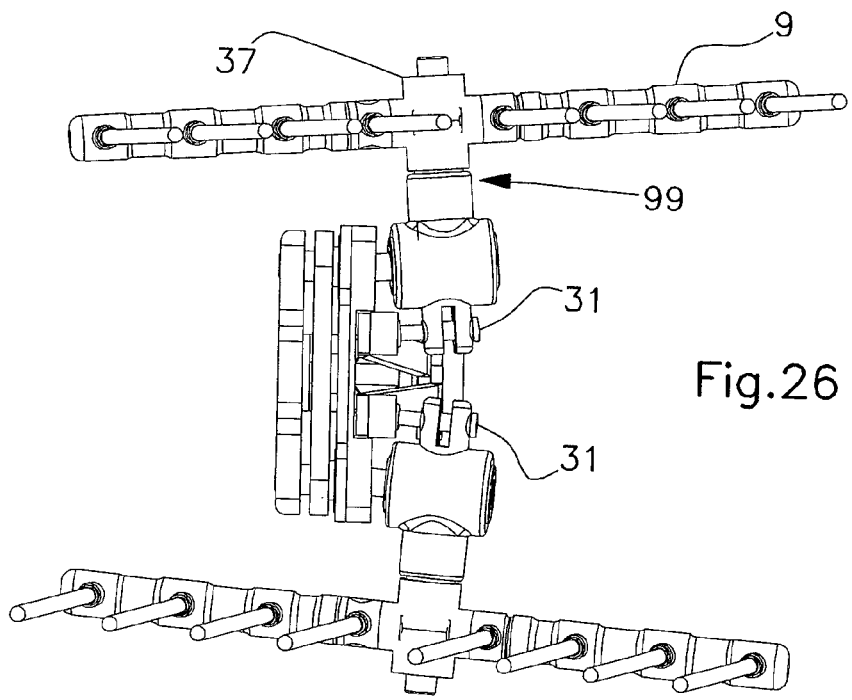
Figure 27:
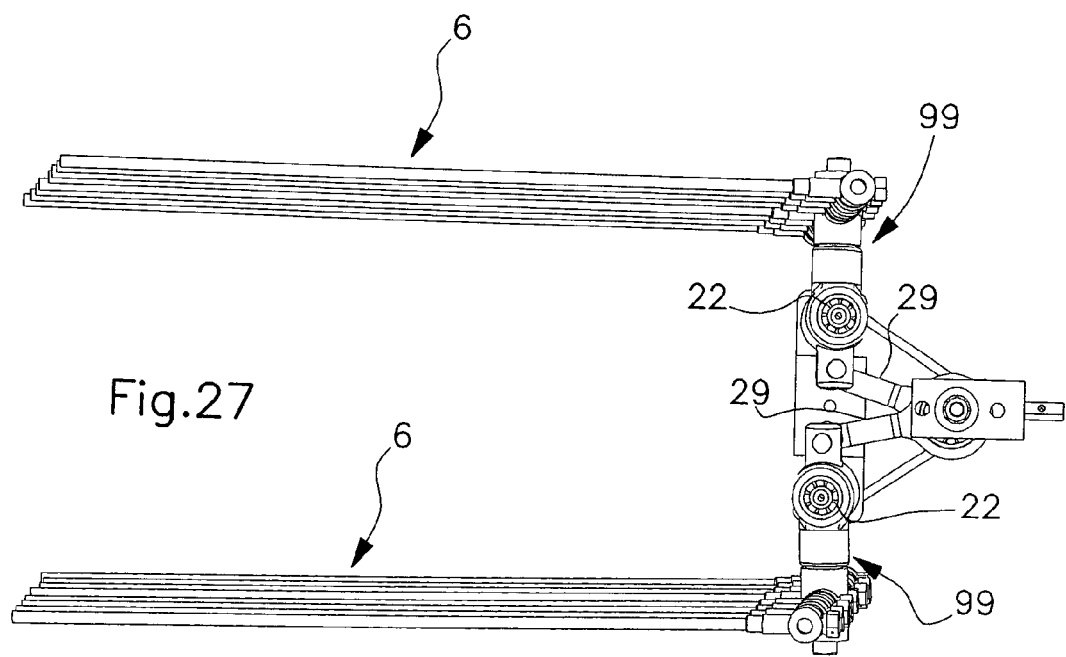

According to a fourth embodiment illustrated in FIGS. from 19 to 23 it is possible to alternatively provide that the drive unit 8 is suitable to drive two comb sectors 6 arranged facing. Such a technical solution is very similar to the first embodiment of the described invention, in particular as to the way of motion transmission to each comb sector 6. More precisely the comb sector 6 with the respective kinematic chains 14, 15 of the first embodiment is repeated in a substantially mirror-like manner according to a median longitudinal plane. For reasons of compactness and structural lightness, it is nevertheless possible to provide a unique kinematic chain 14 for suitably driving both the comb sectors 6. In particular a unique revolution pin 220 can be usefully provided, shaping centrally a keying portion 220a for keying to the respective auxiliary wheel 21 of the first kinematic chain 14 and shaping at its ends respective oblique portions 240 suitable to carry respective crossbars 9 for supporting the teeth 10 (see FIG. 23). Advantageously the illustrated solution provides a couple of plates 28 totally similar to the ones previously described, arranged in a mirror-like way at each side of the auxiliary wheel 21, to realize the rotatable support of the revolution pin 220 and at the same time to offer a respective operating surface 33 for the sliding of the respective connecting rod member 29. Moreover in order to allow the mirror-like arrangement of the comb sectors 6, it is to be observed that the solution presents transmission means 130 functionally similar to the ones previously described, but having a structure adequate to the need for keying a couple of connecting rod members 29 in a mirror-like way as to the cited median longitudinal symmetry plane. In particular the transverse pin 190 of the transmission means 130 carries at the opposite ends the eccentric disks 30 respectively articulated to the connecting rod members 29. In particular, the previously described inclined portion of the connecting rod members 29 is oriented so that the respective portions for articulating to the guide pins 31 can converge to the above said median longitudinal symmetry plane of the apparatus.

Such a solution proves particularly compact and light. Thanks to its configuration with facing combs it is specially indicated in the case of plants which must be treated in a concentrated and uniform way, to harvest the fruits having reduced dimensions. In fact the facing shaker means can easily penetrate in the foliage of the tree and handle in an efficient and concentrated way the volume of the plant comprised between the two facing combs. The remaining technical features are totally similar or can be applied to the embodiments described in the preceding or in the following.

According to a further embodiment illustrated in FIGS. from 24 to 27 the support structure 9 for the teeth comprises the crossbar described so far, called main crossbar, carrying directly the teeth 10, and an auxiliary support crossbar 99. More precisely the auxiliary crossbar 99 is rigidly connected at one end to the main crossbar 9. The crossbars 9 and 99 are rigidly connected, for example according to a perpendicularly angled relationship, so that the support structure 9 has a substantially T shape. To such an end the auxiliary crossbar 99 can comprise a suitable rigid end joint 37 for rigidly connecting to a substantially central portion of the main crossbar 9, or for connecting at opposite parts to semi-crossbars 90. The auxiliary crossbar 99 is further suitable to be in its turn constrained rotatably to a respective revolution pin and to a guide pin 31, in a way totally similar to what is previously described.

The solution illustrated in the figures provides a couple of support structure 9 carrying respective comb sectors 6. In the illustrated solution each comb sector 6 is driven through a respective connecting rod member 29, in a way totally similar to the second described embodiment. Alternatively different arrangements of the drive components, preferably of the type of the ones described for the other illustrated embodiments, can be provided for the same technical solution comprising auxiliary crossbars 99 carrying transversely the main support crossbars 9 of the teeth 10.

Usefully the rigid connection between the main crossbar 9 and the auxiliary crossbar 99 is made through the rigid joint 37 removable to enable an adjustment capability of the positioning and of the orientation of the teeth 10 as wide as possible.

In particular it is to be observed that the provision of the auxiliary crossbar 99 allows to arrange the comb sectors facing each other with a resultant swinging motion of opening and closing, and also possibly of double alternated passage in the volume interposed between the comb sectors 6.

Still, it is to be highlighted that such a solution is particularly versatile as it is able to carry out the harvest of any product, independently from the shape and dimensions of the plant. In fact it suffices to adequate the extension of the auxiliary crossbar 99 and so the centre distance between two opposed main crossbars 9 to increase or decrease at will the volume comprised between both sectors 6, adapting to the exigencies of each case. As a consequence, plants with more or less bulky branches and having more or less voluminous fruits can be equally treated with the same apparatus, simply intervening on the extension of the auxiliary crossbar 99 and/or on the inclination of the teeth 10 with respect thereto, acting on the connection to the rigid joint 37 for fixing the main crossbar 9. The remaining technical features are totally similar or can be applied to the embodiments described in the preceding and in the following.

Figure 28:
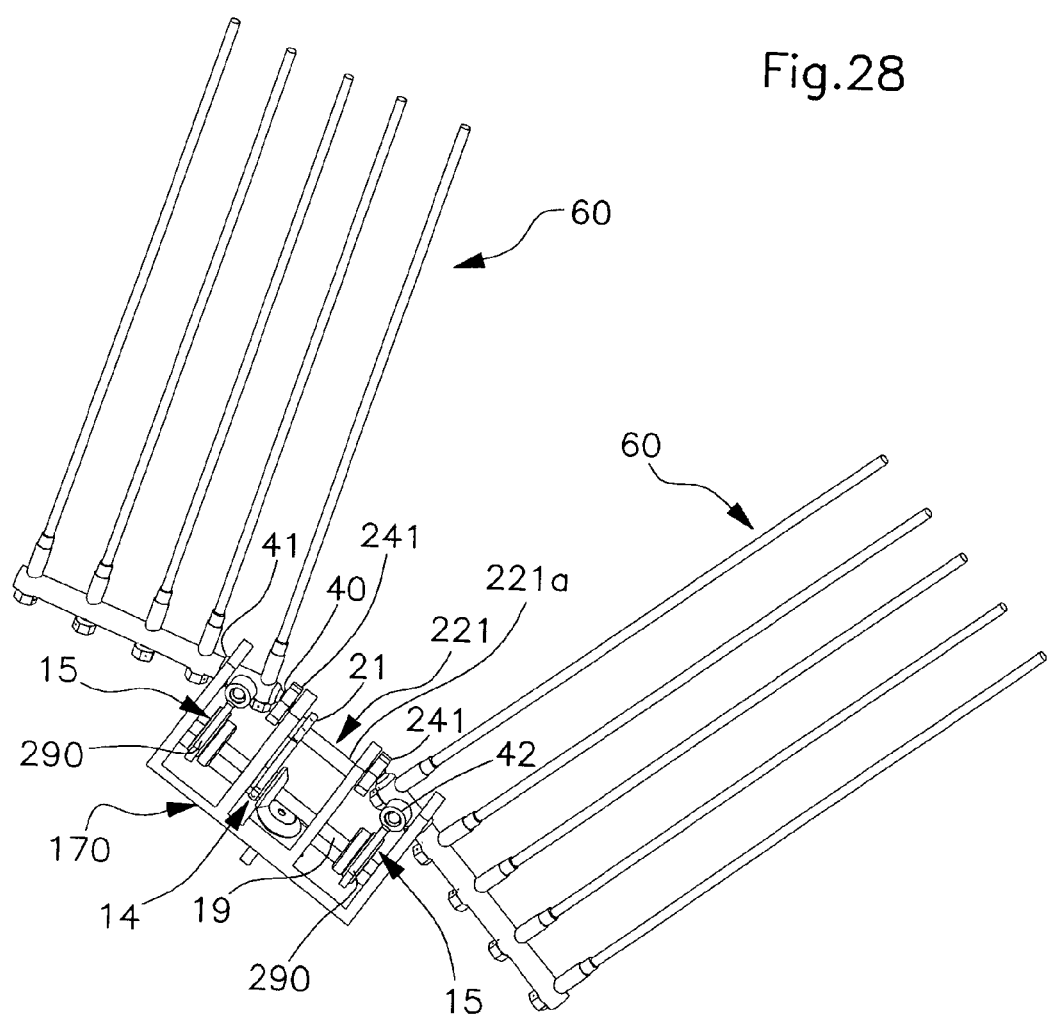
FIG. 28 shows a perspective view of a sixth embodiment of the apparatus in hand.

According to a sixth embodiment illustrated in FIG. 28, the apparatus 1 comprises a couple of comb semi-sectors 60 driven by drive means comprising a first kinematic chain 14 and a second kinematic chain 15. Unlike what previously described, the first kinematic chain 14 is suitable to transmit in output the rotational motion to a revolution pin 221 shaping a keying portion 221a parallel to the transverse pin 19 and a deviated portion 241 which extends preferably orthogonally with respect to the keyed portion 221a. The inclined portion 241 is then connected through an articulated joint 40 with a portion, for example an end portion, of the support structure 9 of the teeth 10. A distal portion of the support structure 9 is further connected through an articulated joint 41 to the fixed support structure 170 of the drive means 8 of the apparatus at a respective wall. A further portion of the support structure 9, for example intermediate between the portions articulated to the aforesaid articulated joints 40, 41, is then further articulated to the second kinematic chain 15, in a way totally similar to what is previously described for the illustrated embodiments. In particular the connecting rod member 290 is directly articulated to the support structure 9 of the teeth 10 through articulated joint means 42 or equivalent means, to transmit a substantially swinging motion, in a way totally similar to what is previously described. This solution has the particular advantage of allowing a swinging motion in a considerably wide space, through a suitable dimensioning of the support structure 9 of the teeth 10, further to that of the revolution pin 221 suitable to originate the cited revolution motion of the support structure 9 about the articulated joint 41 housed in the wall of the fixed support structure 170. The remaining technical features of such an embodiment are totally similar or can be applied both in the structure and in the functioning to the ones previously described.

The functioning of the apparatus for harvesting olives is described in the following.

In a first step, wherein the motor member is inactive, the operator adjusts the longitudinal extension of the support rod 2 blocking it at the desired extension by means of the lever 4. Then he grasps the support rod 2 at the handle 5 and lifts it, positioning it in a substantially vertical way in proximity of the tree wherein harvesting of the olives is needed.

The rod 2 is then manipulated so as to insert progressively the unique comb sector 6 or the comb semi-sectors 60, according to the case, inside the foliage of the tree.

The motor member is actuated acting on the control means present on the handle 5, provoking the activation of the swinging motion of the teeth 10 present on the crossbar. The branches engaged by the teeth 10 are shaken by the combined swinging motion, which results from the combination of the revolution motion of the crossbar 9, 90, 99 about the revolution pin 22 and of the swinging motion about the mobile revolution axis guided by the guide pin 31. The interaction with the intercepted branches provokes the detachment of the olives which so can be harvested on the ground.

The combination of such motions associated with the cross bar 9, 90, 99 actuates the teeth 10 in a three-dimensional resultant motion which is very effective for harvesting the olives on any part of the foliage of the tree.

By suitably displacing the shaker means or combs between the foliage of the tree it is possible to complete the harvesting of the olives.

At the end of the harvesting operations the drive means of the comb sectors 6, 60 are deactivated to put the tool away or to perform the harvesting on further trees.

The apparatus for harvesting olives and the like therefore a (lows to attain the scope of carrying out in an effective and safe manner the harvesting of the olives and similar products.

In practice, the embodiment of the invention, the materials used, as well as the shape and dimensions, may vary depending on the requirements.

Should the technical characteristics mentioned in each claim be followed by reference signs, such reference signs were included strictly with the aim of enhancing the understanding the claims and hence they shall not be deemed restrictive in any manner whatsoever on the scope of each element identified for exemplifying purposes by such reference signs.

The invention claimed is:

1. An apparatus for harvesting olives and similar products, the apparatus comprising:
   a support body suitable to be grasped;
   a shaker unit comprising a containment box suitable to be mounted at the top of said support body;
   at least one comb sector shaping a support structure carrying integral a plurality of teeth, carried mobile by said containment box;
   a motor unit for actuating said comb sector;
   a motor shaft arranged substantially aligned to a longitudinal axis of said support body and suitable to be actuated in a rotary motion by said motor unit;
   a first kinematic chain actuated by said motor shaft, suitable to transmit a first rotary motion; and
   a second kinematic chain actuated by said motor shaft and suitable to transmit a second motion of a substantially reciprocating type, said first kinematic chain and said second kinematic chain being connected to respective distanced portions of said support structure to drive said teeth according to a swinging motion resulting from a combination of said first rotary motion and of said second motion of the substantially reciprocating type.

2. An apparatus according to claim 1, further comprising:
   a means for transmitting connected to said motor shaft for receiving said rotary motion thereof and in parallel to said first kinematic chain and said second kinematic chain.

3. An apparatus according to claim 2, wherein said first kinematic chain comprises an auxiliary wheelwork, said auxiliary wheelwork being actuated by said means for transmitting and keyed to a revolution pin comprising a keying portion and an inclined or deviated portion suitable to deviate said first rotary motion in a revolution motion.

4. An apparatus according to claim 3, wherein said revolution pin is suitable to be inserted rotatable in said support structure and said revolution pin is provided with a casing inserted as covering of an oblique portion through interposition of means for rolling support.

5. An apparatus according to claim 2, wherein said second kinematic chain comprises a connecting rod member connected rotatably and eccentrically with respect to said rotary motion in output from said means for transmitting to produce said second motion substantially alternated, wherein a guide element is articulated to said connecting rod member by a means for articulating.

6. An apparatus according to claim 5, wherein said means for articulating comprises an articulated joint.

7. An apparatus according to claim 3, further comprising:
   a plurality of semi-sectors placed side by side, each of said semi-sectors comprising a respective crossbar of said support structure connected at one end to a respective said revolution pin of said first kinematic chain and to a respective guide element of said second kinematic chain.

8. An apparatus according to claim 7, further comprising:
   one connecting rod member for each crossbar, said connecting rod member being articulated to a respective said guide element through an articulated joint.

9. An apparatus according to claim 7, further comprising:
   a single connecting rod member for said semi-sectors, wherein a means for articulating is connected to said connecting rod member, said means for articulating comprising a guide joint realized through a body shaping guide seats for each guide element realized through couple of pegs protruding from opposite lateral surfaces of said body.

10. An apparatus according to claim 4, wherein said revolution pin is inserted in a substantially central zone of a crossbar and a guide element is a pin constrained to said crossbar in a portion distal to said revolution pin in a same substantially central zone.

11. An apparatus according to claim 1, wherein said support structure comprises a main crossbar carrying integral said teeth and an auxiliary crossbar rigidly constrained to said main crossbar so that a respective longitudinal axis of said main crossbar and of said auxiliary crossbar are incidence axes, said auxiliary crossbar being connected to said first kinematic chain and to said second kinematic chain at said distanced portions to drive said teeth according to said swinging motion resulting from the combination of said first rotary motion and of said second motion of the type substantially alternated.

12. An apparatus according to claim 5, further comprising:
   a plurality of semi-sectors placed side by side, each of said semi-sectors comprising a respective crossbar of said support structure connected at one end to a respective revolution pin of said first kinematic chain and to a respective said guide element of said second kinematic chain.

* * * * *